Figure 1:
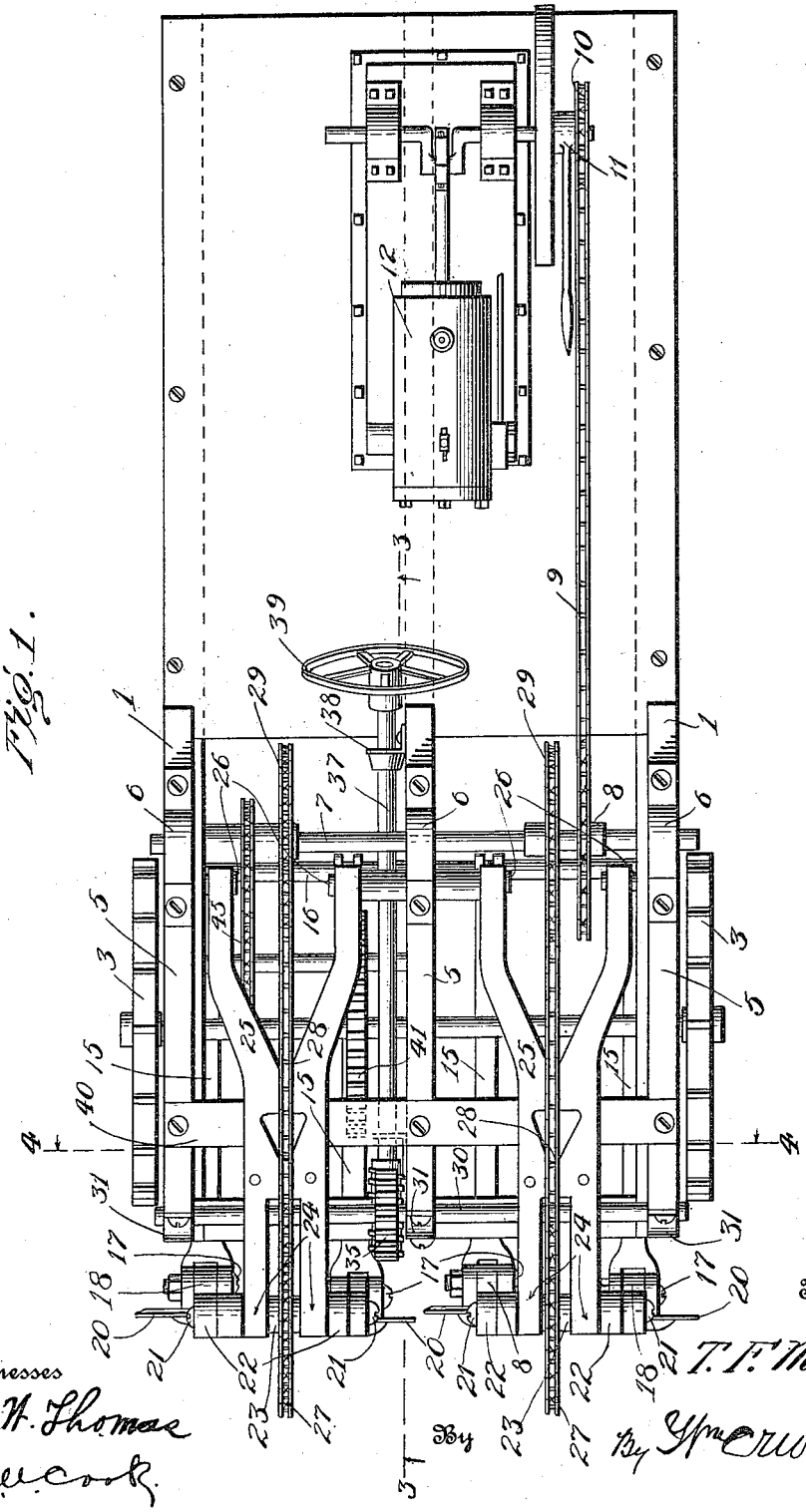

T. F. McGOUGH.
MOTOR CULTIVATOR.
APPLICATION FILED DEC. 8, 1910.

1,081,686.

Patented Dec. 16, 1913.
3 SHEETS—SHEET 1.

Witnesses
E. H. Thomas
S. W. Cook.

Inventor
T. F. McGough
By Wm C W Intire
Attorney

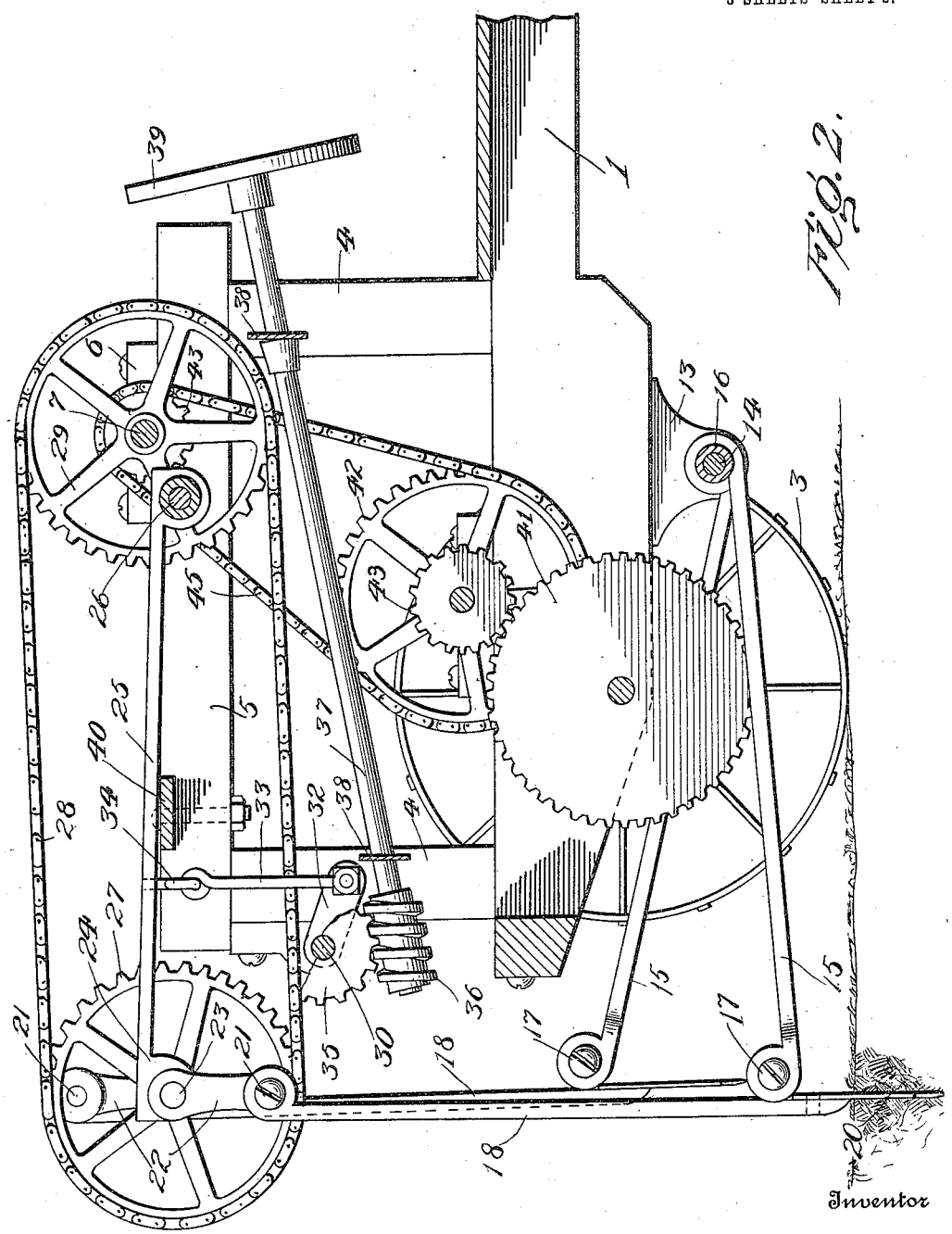

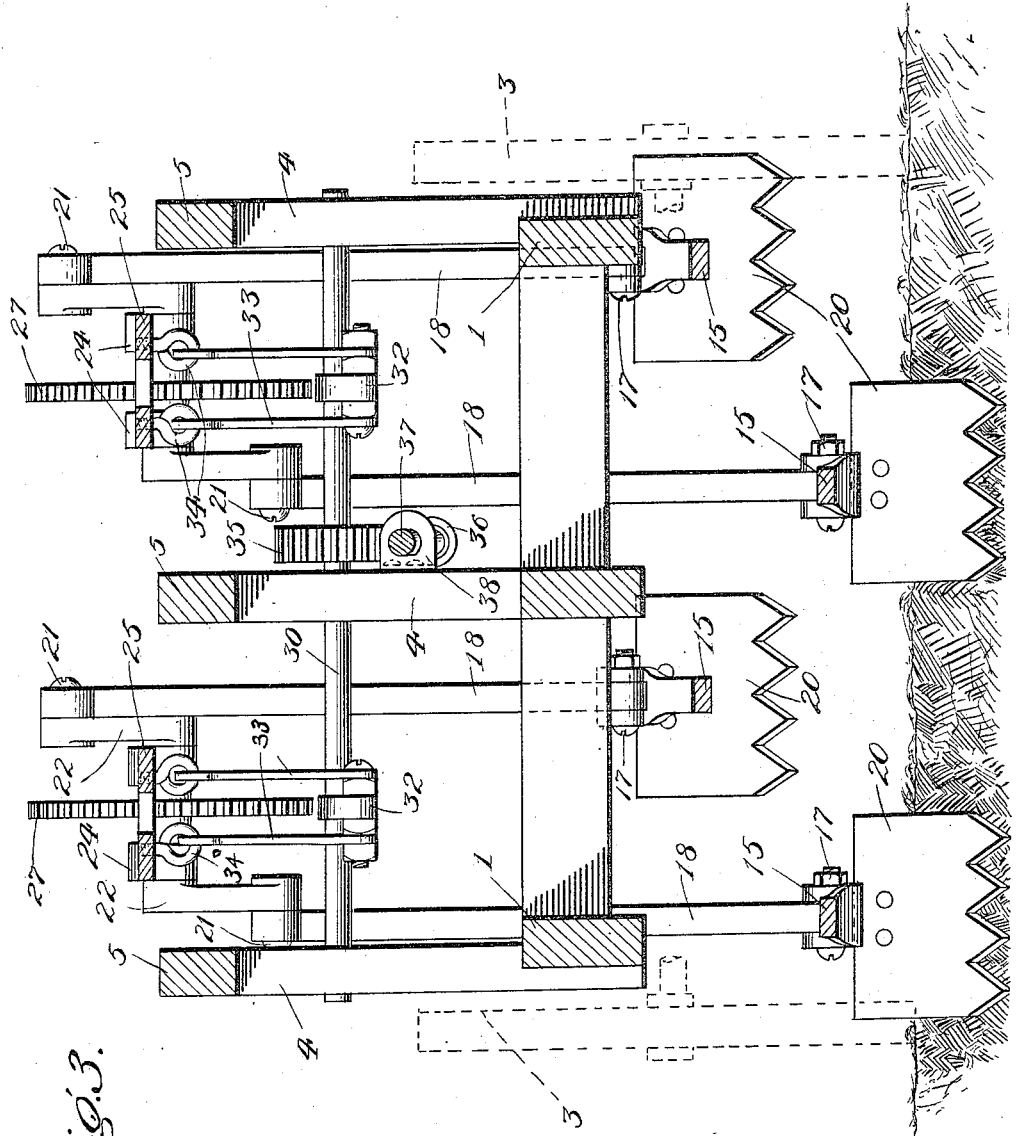

UNITED STATES PATENT OFFICE.

THOMAS FRANCIS McGOUGH, OF NEW ORLEANS, LOUISIANA.

MOTOR-CULTIVATOR.

1,081,686.   Specification of Letters Patent.   Patented Dec. 16, 1913.

Application filed December 8, 1910. Serial No. 596,300.

*To all whom it may concern:*

Be it known that I, THOMAS F. McGOUGH, a citizen of the United States, residing at New Orleans, in the parish of Orleans and State of Louisiana, have invented certain new and useful Improvements in Motor-Cultivators; and I do hereby declare the following to be a full, clear, and exact description of the invention, such as will enable others skilled in the art to which it appertains to make and use the same.

This invention relates to improvements in motor cultivators, and in particular to that class which, not only does the act of plowing, but turns up the sub-soil as well.

The device is simple and positive in its action, and has the necessary qualifications for this sort of work, where the machine is apt to have little mechanical care and treatment.

The device is mounted on the rear of a portable frame or traction engine, and may be driven by any suitable motor power, the same motor being used to drive the rear or traction wheels.

In the drawings the spades are shown with saw-tooth edges, which are particularly adapted for work on new ground where sod or heavy crust has to be broken through in order to turn up the sub-soil. In sandy land, or land that has already been cultivated, spades with straight edges may be used. The peculiar action of the spades is especially efficient in pulverizing, as well as turning up the new soil, thus putting the ground in its best condition for agriculture.

With the above and other objects in view, the invention resides in the novel features of construction, formations, combinations and arrangements of parts to be hereinafter more fully described, claimed and illustrated in the accompanying drawing, in which—

Figure 1 is a top elevation of the machine; Fig. 2 is a partial sectional view of the machine on the line 3—3 of Fig. 1, and Fig. 3 is a sectional view of the machine on the line 4—4 of Fig. 1.

Referring to the drawings by characters of reference, the numeral 1 represents a frame or carriage, mounted at the rear on the two traction or propelling wheels 3. On the rear of the frame 1 is attached a superstructure, consisting of the uprights 4 and cross pieces 5. Journaled on the front of the cross pieces 5, in suitable bearings 6, is a shaft 7, having on one end a gear or sprocket 8, which is driven by some suitable means, as a chain 9, from the sprocket 10, mounted on a clutch 11, which is driven by the source of power 12.

Mounted under the frame 1 are bearings 13, which support a shaft 14, on which are pivoted the ends of a plurality of arms 15, said arms being spaced on the shaft 14 by means of tubes or cylinders 16 mounted on the shaft between said arms. At the rear extremities of the arms 15 are pivoted, by means of suitable pins or bolts 17, the substantially vertically disposed arms 18, to the lower extremities of which are fastened the cultivating spades 20. The upper ends of the arms 18 are journaled on the pins 21 at the extremities of the cranks 22, the centers of which are rigidly attached to the ends of the shafts 23, said shafts being journaled at 24 in the rear ends of the elevating arms 25, the forward ends of said elevating arms being pivoted on the shafts 26, mounted in the cross pieces 5. Mounted on the shafts 23 are sprockets 27, which are driven by chains 28 from similar sprockets 29, mounted on the main shaft 7.

In operation the motor, or source of power drives the sprocket 10, this in turn driving the main shaft 7 through the medium of the chain 9 and sprocket 8. This shaft 7 in turn communicates its rotation to the plurality of counter-shafts 23 through the medium of the sprockets 27 and chains 28, thus causing the cranks to rotate, giving the cultivating spades 20 vertical as well as lateral motion through the medium of the vertically disposed arms 18 and the pivoted arms 15.

It being necessary to regulate the depth of soil in which the cultivating spades operate, a shaft 30 extends across the rear of the uprights 4, journaled in suitable bearings 31, and having mounted on it a plurality of cranks 32, there being two under each elevating arm. At the ends of the cranks are pivoted the substantially vertically retained arms 33, the upper ends of which are inserted in the eye bolts 34, fastened to the under side of the elevating arms, permitting a play between the arms 33 and the arms 25, which also allows the arms 18 to have a vertical play with relation to the ground. This will eliminate the uncomfortable feeling of the operator who controls the device, which would be evident if there was a tight connection between the shaft 30 and the arms 25.

On the shaft 30 is mounted a sector 35, meshing with the worm 36, mounted on the rear end of a shaft 37, placed at right angles to the shaft 30 and held by suitable bearings 38 attached to the upright 4, the forward end of the shaft being provided with a hand wheel 39, by means of which the elevating device is operated.

A cross piece 40 is provided to limit the downward motion of the elevating arms, as well as brace the cross pieces 5. Some suitable means for driving the rear wheels is used, such as the gear 41 mounted on the rear axle, this being driven from the main shaft 7 through the means of the two sprockets 42 and 43, the pinion 44 and the chain 45.

Having thus fully described this invention, what I claim as new and desire to secure by Letters Patent is:

A motor cultivator comprising a frame, a sprocket mounted on one end of the frame, means for rotating said sprocket, arms pivotally connected to the frame and their free ends adapted to carry a shaft, means for rotating said shaft, cultivator arms eccentrically mounted on the shaft, a shaft mounted on the end of said frame, a sector mounted on said shaft and meshing with a worm gear, means for operating the worm gear, arms connected to said sector and extending upwardly, eye bolts connected to first mentioned arms and adapted to receive the ends of last mentioned arms forming means for raising and lowering the cultivator arms in relation to the ground.

In testimony whereof I affix my signature in presence of two witnesses.

THOMAS FRANCIS McGOUGH.

Witnesses:
F. P. QUINLAN,
FRANK MEHRHOFF.

Copies of this patent may be obtained for five cents each, by addressing the "Commissioner of Patents, Washington, D. C."